United States Patent [19]

McBeth

[11] E Patent Number: Re. 33,043

[45] Reissued Date of Patent: Sep. 5, 1989

[54] AIR BLEEDING SYSTEM FOR HYDRAULIC CLOSED CIRCUITS

[75] Inventor: James B. McBeth, N. Vancouver, Canada

[73] Assignee: Teleflex Incorporated, Limerick, Pa.

[21] Appl. No.: 249,769

[22] Filed: Sep. 26, 1988

Related U.S. Patent Documents

Reissue of:

[64] Patent No.: 4,685,293
Issued: Aug. 11, 1987
Appl. No.: 746,526
Filed: Jun. 19, 1985

[51] Int. Cl.[4] ..... F15B 21/04

[52] U.S. Cl. ..... 60/327; 60/453; 60/476; 114/150; 137/171

[58] Field of Search ..... 60/327, 453, 454, 476; 114/150; 137/171

[56] References Cited

U.S. PATENT DOCUMENTS

| | | | |
|---|---|---|---|
| 2,612,237 | 9/1952 | Tear | 137/883 X |
| 3,233,407 | 2/1966 | Smith | 60/453 X |
| 3,504,882 | 4/1970 | Vargo | 60/473 X |
| 3,576,192 | 4/1971 | Wood et al. | 137/102 |
| 3,885,389 | 5/1975 | Hull | 60/453 |
| 3,958,420 | 5/1976 | Yokota | 60/453 |
| 4,042,281 | 8/1977 | Ury | 137/512.1 X |
| 4,398,561 | 8/1983 | Maldavs | 251/149.6 X |
| 4,449,470 | 5/1984 | Rump | 114/150 |
| 4,518,010 | 5/1985 | Mucheyer et al. | 137/592 X |

FOREIGN PATENT DOCUMENTS

| | | | |
|---|---|---|---|
| 104280 | 8/1966 | Denmark | 114/150 |

*Primary Examiner*—Gerald A. Michalsky
*Attorney, Agent, or Firm*—Reising, Ethington, Barnard, Perry & Milton

[57] ABSTRACT

A closed hydraulic system (10) of the type for steering a boat including a hydraulic cylinder (18) having port and starboard sides (20, 22) and a piston (24) within the cylinder (18) moveable therebetween. A steering pump (12) has first and second fluid outlets (14, 16). Port and starboard hydraulic lines (26, 28) interconnect the port and starboard sides (20, 22) to the first and second outlets (14, 16) respectively, for fluid communication therebetween. A closed separator tank (30) separates air from hydraulic fluid. The tank (30) includes port and starboard tank [line] *lines* (32, 34) in fluid communication with the port and starboard hydraulic lines (26, 28) respectively. The tank (30) includes a bleeder valve mechanism for selectively allowing fluid flow in one direction from the port tank line (32) into the separator tank (30) and out the starboard tank line (34) and alternatively in the opposite direction.

30 Claims, 2 Drawing Sheets

AIR BLEEDING SYSTEM FOR HYDRAULIC CLOSED CIRCUITS

Matter enclosed in heavy brackets [ ] appears in the original patent but forms no part of this reissue specification; matter printed in italics indicates the additions made by reissue.

TECHNICAL FIELD

The subject invention relates to a hydraulic control assembly or a package for use in a marine steering system. More specifically, the instant invention relates to a system for removing air from the oil in a closed circuit hydraulic system.

BACKGROUND OF THE INVENTION

Typically, a marine steering system includes a steering or helm pump attached to a steering wheel for directing fluid to opposite ends of an actuator cylinder which, in turn, actuates the rudder to effect steering of a boat. The hydraulic system may be a closed circuit where the flow path of oil or fluid is uninterrupted. The hydraulic fluid flow is in a continuous, uninterrupted path from the pump to the actuator and directly back to the pump. When such a system is initially filled with oil, it is difficult to remove all of the air trapped in the lines, pumps and actuator. This is due to the uninterrupted flow path where there is no escape for the trapped air. In an open circuit oil system, the oil returns to a reservoir which is, in turn, connected to the pump inlet. Unlike the open circuit, closed circuits must be [blead] *bled* by some other technique.

Prior art actuators included bleeder fittings wherein oil is [upmpted] *pumped* out through the bleeder fitting in the actuator or hydraulic cylinder to flush out oil with the trapped air while fresh oil is applied to the pump. The U.S. Pat. No. 3,576,192 to Wood, issued Apr. 27, 1971 discloses an air bleeding system including a valve added to a circuit to bypass all return flow to a reservoir tank so that air is separated in a manner similar to an open circuit system. The U.S. Pat. No. 4,449,470 to Rump, issued May 22, 1984 and assigned to the [assigness] *assignee* of the instant [invnetion] *invention* discloses a reservoir and bypass to a tank valve which are mounted remotely from the pump and pressurized to produce a remotely filled and [bleed] *bled* system.

All three of the aforementioned air bleeding systems have drawbacks when utilized in a marine steering assembly. The method wherein the oil is pumped out through a bleeder fitting requires two people to bleed the system. One person is required to turn the helm and the other to control the oil flow from the bleed fitting. This method also involves catching the oil pumped out of the system, through the bleeder fittings, which could be a [slopper] *sloppy* operation. This method is also not as efficient or as fast as the two other methods which automatically remove air. The second and third previously mentioned methods, however, add components to the hydraulic circuit which inrease its complexity and cost. The more complex the circuit is, the more reliability is reduced. Also, connecting additional systems such as auto [piolots] *pilots* becomes more difficult. Pressurized systems such as disclosed in the Rump patent required the pressure to be maintained continuously to allow the steering system to function. This type of system is, therefore, much more sensitive to leaks than nonpressurized systems. It requires an additional pump to create the air pressure in the reservoir.

Accordingly, the instant invention produces a bleeding system that does not require additional valving as a permanent part of the circuit. It allows bleeding of the system by one person and does not require a permanently pressurized system. The system can be easily attached to the circuit and, once attached, automatically fills and bleeds the entire system. This does not require pumping oil out of the circuit into open containers.

STATEMENT OF THE INVENTION

The subject invention relates to a closed hydraulic system of the type for steering a boat, the system including a hydraulic cylinder having port and starboard sides and a piston within the cylinder moveable therebetween and a steering pump having first and second fluid outlets. Port and starboard hydraulic lines interconnect the port and starboard sides to the first and second outlets, respectively, for fluid communication therebetween. The closed separator [tanks] *tank* separates air from hydraulic fluid. The closed separator tank includes port and starboard tank lines in fluid communication with the port and starboard hydraulic lines respectively. The assembly is characterized by bleeder valve means for selectively allowing fluid flow in one direction from the port tank line into the separator tank and out the starboard tank line and alternately in the opposite direction.

The subject invention further relates to a method of bleeding a closed hydraulic system including the steps of connecting port and starboard tank lines of a closed separator tank to the port and starboard hydrualic lines respectively, leading from the port and starboard sides of a hydraulic cylinder to the port and starboard sides of a steering pump through quick disconnect valves, pumping hydraulic fluid in one direction from the port tank line into the separator tank and out the starboard tank line to remove air from the fluid, pumping the hydraulic fluid in the opposite direction to remove the remaining air in the system, and disconnecting the port and starboard tank lines from the quick disconnect valves.

FIGURES IN THE DRAWINGS

Other advantages of the present invention will be readily appreciated as the same becomes better understood by reference to the following detailed description when considered in connection with the accompanying drawings wherein[;] :

DETAILED DESCRIPTION OF THE DRAWINGS

Figure 1:
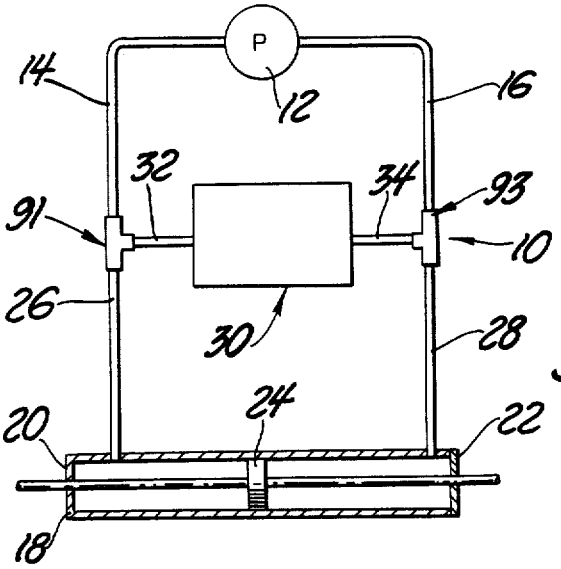
FIG. 1 is a schematic view illustrating a marine steering system utilizing the subject invention.
Figure 2:
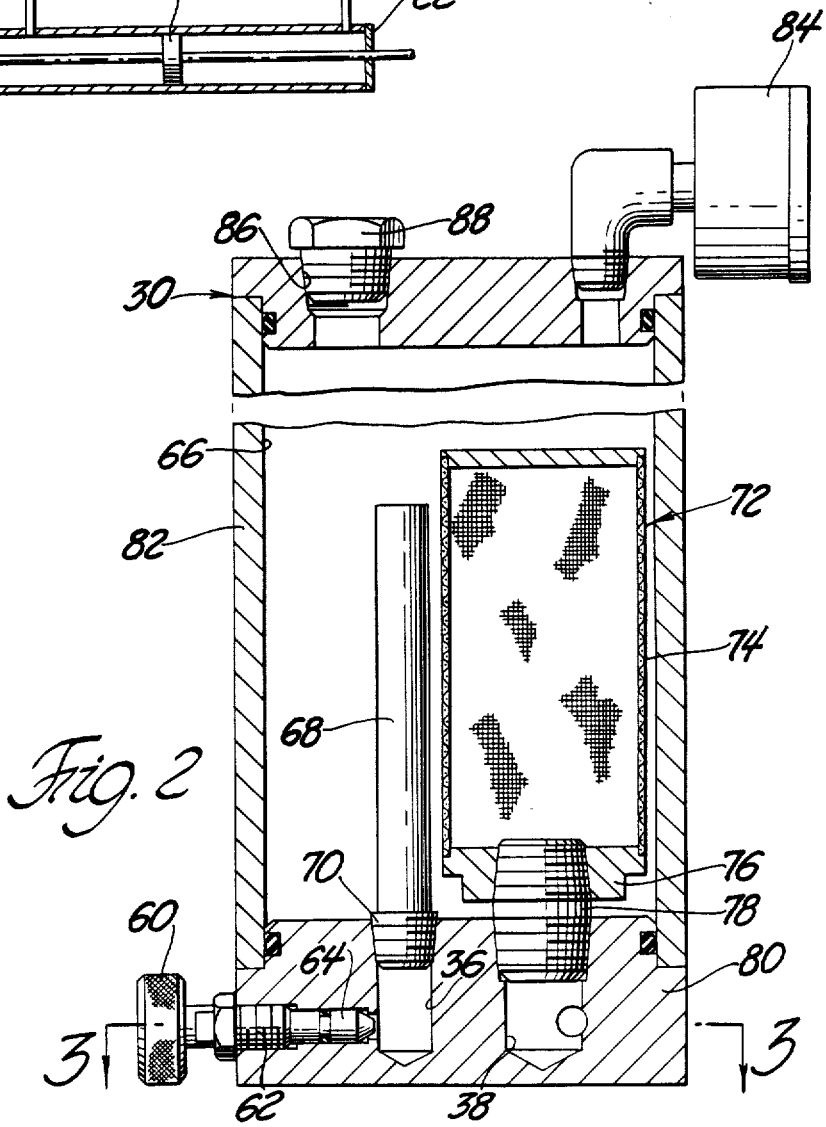
FIG. 2 is a cross-sectional view of the instant invention.

A closed hydraulic system of the type for steering a boat is generally shown at 10 in FIG. 1. The hydraulic system 10 is of the type having a helm steering pump 12 with first and second fluid outlets 14 and 16 respectively.

The system 10 includes an actuating or steering cylinder 18 having port and starboard sides 20, 22 and an actuating piston 24 within the cylinder 18 moveable between the port and starboard sides 20, 22. The piston 24 is actuated to move back and forth in the cylinder 18 in response to fluid delivered from the steering pump 12.

Port and starboard hydraulic lines 26, 28, interconnect the port and starboard sides 20,22 of the hydraluic cylinder 18 to the first and second outlets 14, 16 of the steering pump 12, respectively, for fluid communication therebetween.

Closed separator tank means is generally indicated at 30. The closed separator tank means 30 separates air from hydraulic fluid. The closed separator tank means 30 includes port and starboard tank lines 32 and 34 in fluid communication with the port and starboard hydraulic lines 26, 28, respectively. The assembly 10 is characterized by the closed separator tank means 30 including bleeder valve means for selectively allowing fluid flow in one direction from the port tank line 32 into the separator tank means 30 and out the starboard tank line 34 and alternatively in the opposite direction. This bidirectional capability of the closed separator tank means provides for the assembly to be releasably connected between the port and starboard hydraulic lines 26, 28, as discussed below.

Figure 3:
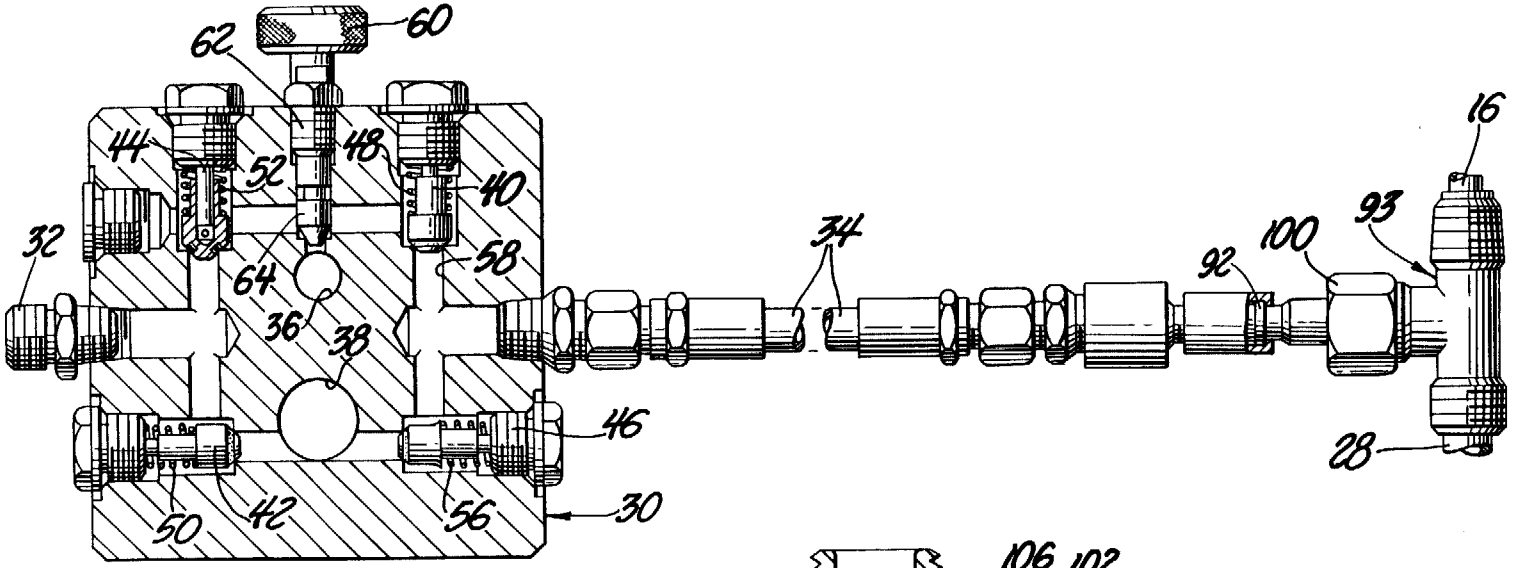
FIG. 3 is a cross-sectional view taken substantially along lines 3—3 of FIG. 2.

More particularly, the separator tank means 30 includes a tank inlet port 36 and a tank outlet port 38. The bleeder valve means includes port bleed check valve means for allowing one-way flow from the port tank *line 32 to the tank inlet port 36 and out the tank* outlet port 38 to the starboard tank line 34, and starboard bleed check valve means for allowing one-way flow from the starboard tank line 34 to the tank inlet port 36 and out the tank outlet port 38 to the port tank line 32. As shown in FIG. 3, the port bleed check valve means includes a port air bleed check valve 44 for allowing one-way fluid flow from the port tank line 32 to the tank inlet 36 to trap air in the [seaparator] *separator* tank means 30 and a starboard liquid check valve 46 for allowing one-way flow of liquid from the separator tank means 30 and through the tank outlet 38 to the starboard tank line 34. The starboard check valve means includes a starboard air bleed check valve 40 for allowing one-way fluid flow from the starboard tank line 34 to the tank inlet 36 to trap air in the separator tank means 30 and a port liquid check valve 42 for allowing one-way flow of liquid from the separator tank means 30 and through the tank outlet port 38 to the port tank line 32.

Each of the check valves is a plunger member 40, 42, 44, 46 biased by springs 48, 50, 52, 56 to a closed position. Fluid flow forces the opening of the valve against the spring biased pressure to allow flow through the system.

The bleeder valve means includes a passageway 58 in fluid communication from the port tank line 32 to the tank inlet 36 and from the tank inlet 36 to the starboard tank line 34 and from the starboard tank line 34 to the tank outlet 38 and from the tank outlet 38 to the port tank line 32. In other words, the separator tank means includes a single passageway 58 in fluid communication between the various inlet and ports. Disposed along the passageway are the various check valves. The port air check valve 44 is mounted within the passageway 58 between the port tank line 32 and the tank inlet port 36. The starboard liquid check valve 46 is mounted within the passageway 58 between the tank outlet port 38 and the starboard tank line 34. The starboard air bleed check valve 40 is mounted within the passageway 58 between the starboard tank line 34 and the tank inlet port 36 and the port liquid check valve 42 is mounted within the passageway 58 between the tank outlet port 38 and the port tank line 32.

The tank inlet port 36 includes flow control valve means for creating a restriction on the inlet side of port 36. The flow control valve means includes an adjustment orifice for adjusting the amount of pressure drop through the tank inlet port 36. Valve member 60 includes a threaded portion 62 for further inserting or removing a sealing end portion 64 which constricts or opens the passageway 58 from either the port or starboard tank lines 32, 34 to the tank inlet port 36.

The closed separator tank means 30 includes a fluid reservoir 66 for containing hydraulic fluid therein. The tank inlet and outlet ports 36, 38 are in fluid communication with the reservoir 66. A tube member 68 is connected to the tank inlet port 36 by a threaded connected 70. The tube member 68 extends from the tank inlet port 36 into the fluid reservoir 66. The separator tank means 30 further includes filter means generally indicated at 72 disposed over the tank outlet port 38 for filtering residue from the fluid flowing from the reservoir 66 into the tank outlet port 38. The filter means 72 includes a substantially cylindrical filter 74 mounted on a base portion 76. An adapter 78 interconnects the filter assembly 72 to the fluid outlet port 38.

In the preferred embodiment, the separator tank means includes a base portion 80 containing the bleeder valve means and the tank inlet and outlet ports 36,38. The fluid reservoir 66 is contained within a housing 82 extending upwardly from the base 80. The housing 82 may include a pressure indicator 84 and a fluid inlet 86 for filling fluid into the reservoir 66. A cap member 88 is in sealing engagement with [th einlet] *the inlet* 86.

The assembly 10 includes port quick disconnect means generally indicated at 91 for releasably and sealingly interconnecting the port hydraulic line 26 to the port tank line 32 and starboard quick disconnect means, generally indicated at 93, for releasably and sealingly interconnecting the starboard hydraulic line 28 to the starboard tank line 34.

Figure 4:
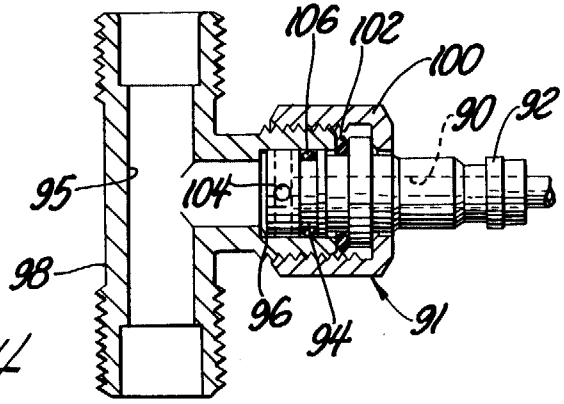
FIG. 4 is a cross-sectional view of the quick disconnect [beads] *means* of the instant invention.

FIG. 4 shows an enlarged cross-sectional view of the port quick disconnect means which is illustrative of both the starboard and port quick disconnect means 91,93. Referring to FIG. 4, the quick disconnect means 91 includes a first fluid passageway 95 forming an integral portion of the hydraulic lines 26, 28. The quick disconnect means 91 includes a second fluid passageway 90 in fluid communication between the first passageway 95 and the port and starboard tank lines 32, 34. The quick disconnect means 91 further includes a quick disconnect line coupler 92 containing the second passageway 90 adapted to be connected to either of the tank lines 32, 34. The quick disconnect means 91, 93 further includes quick disconnect valve means 94 for selectively allowing fluid flow from the first passageway 95 to the second passageway 90. More particularly, the coupler 92 comprises an insert member 92 which is held against an inside shoulder 96 of a T-shaped fitting 98 which contains the first passageway 95. The adapter 92 is retained by a nut number 100. When torqued down by the nut member 100, a pressure proof seal is produced between the insert 92 and the shoulder 96. When the nut is backed off, an O-ring 102 acts as a spring to lift the insert 92 off the shoulder 96 and allow fluid flow through hole 104 and out the first passageway 90. O-ring 106 prevents oil leakage.

In operation, the port and starboard tank lines 32,34 are attached to the bleeder fittings 91, 93 which are mounted in the main hydraulic lines 26, 28 on either side of the actuating cylinder 18. If the fluid flow direction is in through port tank line 32, the flow will open check valve 44 and pass the fluid flow control 60 into tank inlet port 36. Both check valves 42 and 40 will prevent flow from taking an alternate path. Flow entering tank inlet port 36 will continue up the tube member 68 and into the reservoir 66. Oil in the bottom of the tank 30 will be [foreced] *forced* through the filter 74 and out the tank outlet port 38. As the base 76 raises the filter 74 above the base 80, residue will settle below the support 76 on the base 80. The outlet through the adapter 78 is then raised above the level of the residue on the base 80. The flow of fluid will then continue out through the valve 46 into the opposite starboard tank line 34. Flow cannot pass back through check valve 42 since it is held shut by the inlet pressure which is always slightly higher than the outlet pressure.

The flow control valve 60 is used to control the pressure drop across the orifice created at its tapered end 64. This pressure drop occurs on the inlet side and therefore does not tend to increase tank pressure. Flow in the [oppsoite] *opposite* direction will also be directed into tank inlet port 36 and out through tank outlet port 38.

The housing 82 can be shaped in various ways and can contain baffles or screen which aid in separating the air from the fluid. The pressure gauge 84 is provided for checking the tank pressure.

To fill and bleed the system, a header is used which can be any oil container which has a top vent and a bottom outlet. A hose is attached from the header tank outlet to the top vent hole of the uppermost helm [pup] *pump* by an appropriately tight leak tight fitting. The header and separator tank means 30 are filled with fluid and then attached to the circuit. With the bleeder fittings 91, 93 open, oil is pumped around the circuit from each pump, first in one direction and then in the other. Since the separator tank means 30 is connected across the cylinder 18, fluid can be continually pumped around the circuit even after the [pistin] *piston* 24 reaches its limit of movement within the cylinder 18. As fluid flows through the separator tank means 30, the air is removed. Once all air has been removed for one pumping direction, the only remaining air will be in the cylinder 18. Reversal of the pumping direction moves the piston 24 to its other limit forcing the trapped air back into the circuit to be removed as it is pumped through the separator tank means 30 as it completes a turn through the circuit. Flow control 60 can be adjusted to provide sufficient pressure drop to assure that the piston 24 is forced all the way to its limit in either direction. The separator tank means 30 is a closed tank with enough oil volume to replace all trapped air in the circuit.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A closed hydraulic system (10) of the type for steering a boat, said system comprising: a hydraulic cylinder (18) having port and starboard sides (20,22) and a piston (24) within said cylinder (18) movable therebetween; a steering pump (12) having first and second fluid outlets (14,16) port and starboard hydraulic lines (26,28) interconnecting said port and starboard sides (20,22) to said first and second outlets (14,16) respectively, for fluid communication therebetween; closed separator tank means (30) for separating air from hydraulic fluid within said closed separator tank means (30), said closed separator tank means (30) including port and starboard tank lines (32,34) in fluid communication with said port and starboard hydraulic lines (26,28) and said first and second fluid outlets (14,16) respectively, to define a closed hydraulic circuit and characterized by said closed separator tank means (30) including bleed valve means for selectively allowing fluid flow from said port tank line (32) into and through said separator tank means (30) in one direction and out said starboard tank line(34) and alternatively in the opposite direction.

2. A system as set forth in claim 1 further characterized by said separator tank means (30) including a tank inlet port (36) and a tank outlet port (38), said bleed valve means including port bleed *check* valve means for allowing one-way flow from said port tank line (32) to said tank inlet port (36) and out said tank outlet port (38) to said starboard tank line (34) and starboard bleed check [vavle] *valve means for allowing one-way flow from said stardboard tank line (34) to said tank inlet port (36) and out said tank outlet port (38) to said port tank line (32).*

3. A system as set forth [inclaim] *in claim* 2 further characterized by said port bleed check valve means including a port air bleed check valve (44) for allowing one-way fluid flow from said port tank line (32) to said tank inlet (36) to trap air in said separator tank means (30) and a starboard liquid check valve (46) for allowing one-way flow of liquid from said separator tank means (30) and through said tank outlet (38) to said starboard tank line (34), and by said starboard check valve means including a starboard air bleed check valve (40) for allowing one-way fluid flow from said starboard tank line (34) to said tank inlet (36) to trap air in said separator tank means (30) and a port liquid check valve (42) for allowing one-way flow of liquid from said separator tank means (30) and through said tank outlet port (38) to said port tank line (32).

4. A system as set forth in claim 3 further characterized by said bleed valve means including a passageway (58) in fluid communication from said port tank line to said tank inlet (36) and from said tank line (36) to said starboard tank line (34) and from said starboard tank line (34) to said tank outlet (38) and from said tank outlet (38) to said port tank line (32), said port air bleed check valve (44) being mounted within said passageway (58) between said port tank line (32) and said tank inlet port (36), said starboard liquid check valve (46) being mounted within said passageway (58) between said tank outlet port (38) and said starboard tank line (34), said starboard air bleed check valve (40) being mounted within said passageway (58) between said starboard tank line (34) and said tank inlet port (36), and said port liquid check valve (42) being mounted within said passageway (58) between said tank outlet port (38) and said port tank line (32).

5. A system as set forth in claim 4 further characterized by said tank inlet port (36) including flow control valve means for controlling the movement of fluid flow into said tank inlet port (36).

6. A system as set forth in claim 5 further characterized by said flow control valve means including an adjustment orifice for adjusting the pressure drop in the flow through said tank inlet port (36).

7. A system as set forth in claim 1 further characterized by including port quick disconnect means (91) for releasably and sealingly interconnecting said port hydraulic line (26) to said port tank line (32) and starboard quick disconnect means (93) for releasably and sealingly interconnecting said starboard hydraulic line (28) to said starboard tank line (34).

8. A system as set forth in claim 7 further characterized by said port and starboard quick disconnect means (91, 93) including a first fluid passageway (95) forming an integral portion of said port and starboard hydraulic lines (26, 28) respectively, and a second fluid passageway (90) in fluid communication between said first passageway (95) and said port and starboard tank lines (32, 34) respectively, a quick disconnect line coupler (92) containing said second passageway (90), said port and starboard tank lines (32, 34) being releasably and sealingly connected to said coupler (92).

9. A system as set forth in claim 8 further characterized by said port and starboard quick disconnect means (91, 93) including quick disconnect valve means (94) for selectively allowing fluid flow from said first passageway (95) to said second passageway (90).

10. A system as set forth in claim 1 further characterized by said closed separator tank means (30) including a fluid reservoir (66), said tank inlet and outlet port (36, 38) being in fluid communication therewith.

11. A system as set forth in claim 10 further characterized by said closed separator tank means (30) including a tube member (68) extending from said tank inlet port (36) into said fluid reservoir (66).

12. A system as set forth in claim 11 further characterized by including a base (80) containing said bleeder valve means and said tank inlet and outlet port (36, 38), said fluid reservoir (66) including a housing (82) extending upwardly from said base (80).

13. A system as set forth in claim 10 further characterized by including filter means disposed over said tank outlet port (38) for filtering residue from the fluid flowing from said reservoir (66) into said tank outlet port (38).

14. A system as set forth in claim [12] *13* further characterized by including filter support means (76) connected to said tank outlet port (38) for supporting said filter means (82) and raising said filter means (72) from said base (80).

15. A hydraulic fluid bleeder assembly comprising; a separator tank means (30) for separating air from hydraulic fluid within said separator tank means (30), said separator tank means (30) including port and starboard tank lines (32,34) and characterized by including bleeder valve means for allowing fluid flow from said port tank line (32) into and through said separator tank means (30) in one direction and out said [starboad] *starboard* tank line [(32)] (*34*) and alternately in the opposite direction, said separator tank means (30) including a tank inlet port (36) and a tank outlet port (38), said bleed valve means including port bleed check valve means for allowing one-way flow from said port tank line (32) to said tank inlet port (36) and out said tank outlet port (38) to said starboard tank line (34), and starboard bleed check valve means for allowing one-way flow from said starboard tank line (34) to said tank inlet port (36) and out said tank outlet port (38) to said port tank line (32).

16. A system as set forth in claim 15 further characterized by said port bleed check valve means including a port air bleed check valve (44) for allowing one-way fluid flow from said port tank line (32) to said tank inlet (36) to trap air in said separator tank means (30) and a starboard liquid check valve (46) for allowing one-way flow of liquid from said separator tank means (30) and through said tank outlet (38) to said starboard tank line (34), and by said starboard check valve means including a starboard air bleed check valve (40) for allowing one-way fluid flow from said starboard tank line (34) to said tank inlet (36) to trap air in said separator tank means (30) and a port liquid check valve (42) for allowing one-way flow of liquid from said separator tank [mans] *means* (30) and through said tank outlet port (38) to said port tank line (32).

17. A system as set forth in claim 16 further characterized by said bleed valve means including a passageway (58) in fluid communication from said port tank line to said tank inlet (36) and from said tank inlet (36) to said starboard tank line [(38)] (*34*) and from said starboard tank line (34) to said tank outlet (38) and from said tank outlet (38) to said port tank line (32), said port air bleed check valve (44) being mounted within said passageway (58) between said port tank line (32) and said tank inlet port (36), said starboard liquid check valve (46) being mounted within said passageway (58) between said tank outlet port (38) and said starboard tank line (34), said starboard air bleed check valve (40) being mounted within said passageway (58) between said starboard tank line (34) and said tank inlet port (36), and said port liquid check valve (42) being mounted within said passageway (58) between said tank outlet port (38) and said port tank line (32).

18. A system as set forth in claim 17 further characterized by said tank inlet port (36) including flow control valve means for controlling the movement of fluid flow into said tank inlet port (36).

19. A system as set forth in claim 18 further characterized by said flow control valve means including an adjustment orifice for adjusting the pressure drop in the flow through said tank inlet port (36).

20. A system as set forth in claim 15 further characterized by said [closed] separator tank means (30) including a fluid reservoir (66), said tank inlet and outlet port (36, 38) being in fluid communication therewith.

21. A system as set forth in claim 20 further characterized by said [closed] separator tank means (30) including a tube member (68) extending from said tank inlet port (36) into said fluid reservoir (66).

22. A system as set forth in claim 21 further characterized by including filter means disposed over said tank outlet port (38) for filtering residue from the fluid flowing from said reservoir (66) into said tank outlet port (38).

23. A system as set forth in claim 22 further [chracterized] *characterized* by including a base (80) containing said [blender] *bleeder* valve means and said tank inlet and outlet port (36, 38) said fluid reservoir (66) including a housing (82) extending upwardly from said base (80).

24. A hydraulic fluid bleeder assembly comprising; a separator tank means (30) for separating air from hydraulic fluid within said separator tank means (30), said separator tank means (30) including port and starboard tank lines (32,34) and characterized by including bleeder valve means for allowing fluid flow from said port tank line (32) into and through said separator tank means (30) in one direction and out said starboard tank line (32) and alternately in the opposite direction, port quick disconnect means (91) for releasably and sealingly interconnecting said port tank line (32) to a port hydraulic line (26) of a steering assembly (10) and starboard quick disconnect means (93) for releasably and sealingly interconnecting said starboard tank line (34) to a starboard hydraulic line (28) of a steering assembly (10).

25. A system as set forth in claim 24 further characterized by said port and starboard quick disconnect means (91, 93) including a [firt] *first* fluid passageway (95) forming an integral portion of said port and starboard hydraulic lines (26, 28) respectively, and a second fluid passageway (90) in fluid communication between said first passageway (95) and said port and starboard tank lines (32, 34) respectively, a quick disconnect line coupler (92) containing said second passageway (90), said port and starboard tank lines (32, 34) being releasably and sealingly connected to said coupler (92).

26. A system as set forth in claim 25 further characterized by said port and starboard quick disconnect means (91, 93) including quick disconnect valve means (94) for selectively allowing fluid flow from said first passageway (95) to said second passageway (90).

27. A method of bleeding a closed hydraulic system (10) of the type for steering a boat, said method comprising the steps of: connecting port and starboard tank lines (32,34) of a closed separator tank (30) to the port and starboard hydraulic lines (26,28), respectively, leading from the port and starboard sides of a hydraulic cylinder (18) to the port and starboard sides of a steering pump (12) through quick disconnect valves (91,93) to define a closed hydraulic circuit; pumping hydraulic fluid from the port tank line (32) into and through the separator tank (30) in one direction and out the starboard tank line (34) to remove air from the hydraulic fluid within the closed separator tank (30); pumping the hydraulic fluid in the opposite direction to remove the remaining air from the system (10); and disconnecting the port and starboard tank lines (32,34) from the quick disconnect valves (91,93).

*28. A hydraulic system (10) of the type for steering a boat and for connection to a bleeder connection, said system comprising; a hydraulic cylinder (18) having port and starboard sides (20, 22) and a piston (24) within said cylinder (18) movable therebetween; a steering pump (12) having first and second fluid outlets (14, 16), port and starboard hydraulic lines (26, 28) interconnecting said port and starboard sides (20, 22) to said first and second outlets (14, 16) respectively, for fluid communication therebetween; and port quick disconnect means (91) for releasably and sealingly interconnecting said port hydraulic line (26) to a bleeder, and starboard quick disconnect means (93) for releasably and sealingly interconnecting said starboard hydraulic line (28) to the bleeder connection.*

*29. A system as set forth in claim 28 further characterized by said port and starboard quick disconnect means (91, 93) including a first passageway (95) forming an integral portion of said port and starboard hydraulic lines (26, 28) respectively, and a second fluid passageway (90) in fluid communication between said first passageway (95) and said port and starboard tank lines (32, 34) respectively, a quick disconnect line coupler (92) containing said second passageway (90), for releasable and sealing connection of the bleeder to said coupler (92).*

*30. A system as set forth in claim 29 further characterized by said port and starboard quick disconnect means (91, 93) including quick disconnect valve means (94) for selectively allowing fluid flow from said first passageway (95) to said second passageway (90).*

* * * * *